US008978221B1

(12) United States Patent
Somerville et al.

(10) Patent No.: US 8,978,221 B1
(45) Date of Patent: Mar. 17, 2015

(54) PULLER DEVICE

(76) Inventors: Dean S. Somerville, Cooperstown, ND (US); Mitchel D. Trostad, Cooperstown, ND (US)

( * ) Notice: Subject to any disclaimer, the term of this patent is extended or adjusted under 35 U.S.C. 154(b) by 776 days.

(21) Appl. No.: 13/241,702

(22) Filed: Sep. 23, 2011

(51) Int. Cl.

| | |
|---|---|
| ***B23P 19/04*** | (2006.01) |
| ***B66F 3/24*** | (2006.01) |
| ***B25B 27/02*** | (2006.01) |

(52) U.S. Cl.

CPC ............... *B25B 27/02* (2013.01); *B25B 27/026* (2013.01); *B25B 27/023* (2013.01)

USPC .............................. 29/261; 29/259; 254/93 R

(58) Field of Classification Search

CPC .... B25B 27/02; B25B 27/023; B25B 27/026; B25B 27/062

USPC .......... 254/134, 2 C, 93 R; 29/261, 262, 259, 29/260, 267

See application file for complete search history.

(56) References Cited

U.S. PATENT DOCUMENTS

| | | | | |
|---|---|---|---|---|
| 1,794,494 | A * | 3/1931 | Noble | 29/261 |
| 6,609,283 | B1 * | 8/2003 | Somerville | 29/262 |
| 7,117,573 | B1 * | 10/2006 | Hu | 29/261 |

* cited by examiner

*Primary Examiner* — Lee D Wilson
*Assistant Examiner* — Seahee Yoon
(74) *Attorney, Agent, or Firm* — Dave Alan Lingbeck

(57) ABSTRACT

A puller device for pulling bearings, gears, wheels and pulleys from objects such as shafts and axles and other machine parts. The puller device includes a jaw support assembly; jaw members being in operable communication with the jaw support assembly; a jaw actuating assembly being supported by the jaw support assembly and including a jaw guide member being in operable communication with the jaw members; and an elongate push member being adjustable relative to and in operable communication with the jaw support assembly for urging against an object to facilitate the removal of a press fitted work piece.

8 Claims, 3 Drawing Sheets

PULLER DEVICE

BACKGROUND OF THE INVENTION

1. Field of the Invention

The present invention relates to puller devices and more particularly pertains to a new puller device for pulling bearings, gears, wheels and pulleys from objects such as shafts and axles and other machine parts.

2. Description of the Prior Art

The use of puller devices is known in the prior art. More specifically, puller devices heretofore devised and utilized are known to consist basically of familiar, expected and obvious structural configurations, notwithstanding the myriad of designs encompassed by the crowded prior art which have been developed for the fulfillment of countless objectives and requirements.

The prior art includes three pivotally mounted jaws and a cam ring which moves forward to pivot and lock the jaws about an object. The improvements comprise a flange-less, disk-like collar having axial slots therein to pivotally mount the jaws, a threaded sleeve which is threaded into a receiving member of the collar, and a T-handle which replaces the nut and which can be adjusted without a tool. Another prior art includes a puller having three pivotally mounted jaws and a cam ring which moves forward to pivot and lock the jaws about an object. A projecting lug structure is suspended only from the cam ring which projects beneath the under surfaces of the jaws to cam the jaws apart as the cam ring moves rearward with the projecting lug of the cam ring engaging the undersurfaces of the jaws. The under surfaces of the jaws follow a tapered path relative to the movement of the cam ring so as to cam the jaws apart. Yet, another prior art includes a locking puller for pulling such objects as the inner race of a bearing, gear, or sprocket off of shafts. The puller has three jaws each pivotally mounted to a collar to enable the jaws to pivot radially toward one another to engage such objects to pull such objects off of a shaft. The apparatus has a cam ring with a triangular shape and rearwardly extending braces which are fixed to a rearward ring. The collar has a rearwardly threaded cylindrical portion with a nut threaded onto the cylindrical portion. The nut has an annular groove with the rearward ring rotatably mounted to a nut in the groove. The cam ring surrounds jaws at a location forward of the pivotal mounting of the jaw. The jaws are tapered. The tapered surfaces of the forward end of the jaws have a radius greater than that of the inner surfaces of the cam ring when an object to be pulled is engaged between the jaws, whereby an operator may rotate the nut to move the rearward ring forward thereby moving the braces and cam ring forward until the cam ring engages the outer surfaces of the jaws in a wedging manner to thereby lock the jaws to the object to be pulled. A rod is threaded into the center of the collar which is thereafter rotated to move it forward until it engages the end of the shaft and force is applied to move the rod further forward with the jaws thereby pulling the object rearward towards the end of the shaft. While these devices fulfill their respective, particular objectives and requirements, the aforementioned patents do not disclose the present puller device.

SUMMARY OF THE INVENTION

The general purpose of the present invention, which will be described subsequently in greater detail, is to provide a new puller device which has many of the advantages of the puller devices mentioned heretofore and many novel features that result in a new puller device which is not anticipated, rendered obvious, suggested, or even implied by any of the prior art puller devices, either alone or in any combination thereof. The present invention includes a jaw support assembly; jaw members being in operable communication with the jaw support assembly; a jaw actuating assembly being supported by the jaw support assembly and including a jaw guide member being in operable communication with the jaw members; and an elongate push member being adjustable relative to and in operable communication with the jaw support assembly. None of the prior art includes the combination of the elements of the present invention.

There has thus been outlined, rather broadly, the more important features of the puller device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new puller device which has many of the advantages of the puller devices mentioned heretofore and many novel features that result in a new puller device which is not anticipated, rendered obvious, suggested, or even implied by any of the prior art puller devices, either alone or in any combination thereof.

Still another object of the present invention is to provide a new puller device for pulling bearings, gears, wheels and pulleys from objects such as shafts and axles and other machine parts.

Still yet another object of the present invention is to provide a new puller device that substantially increases the performance to effectively clamp the jaws about and remove the bearings, gears, wheels and pulleys.

Even still another object of the present invention is to provide a new puller device that not only increases performance, but also maintains the clamping torque needed to accomplish the task.

Also another object of the present invention is to provide a new puller device that substantially reduces the time it takes to effectively remove the bearings, gears, wheels and pulleys.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
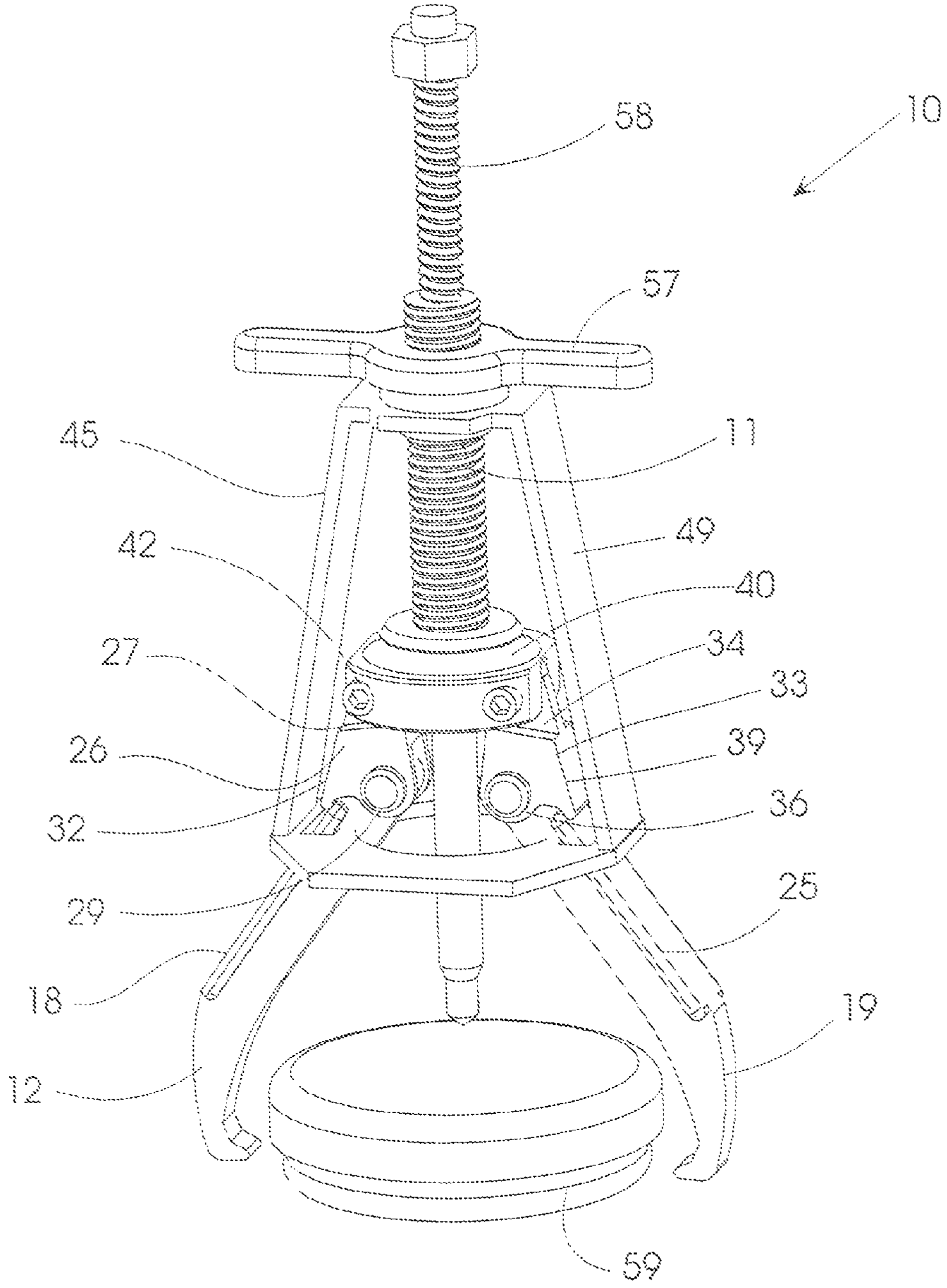
FIG. 1 is a perspective view of the puller device with the linkage being unloaded as shown in the attachment.
Figure 2:
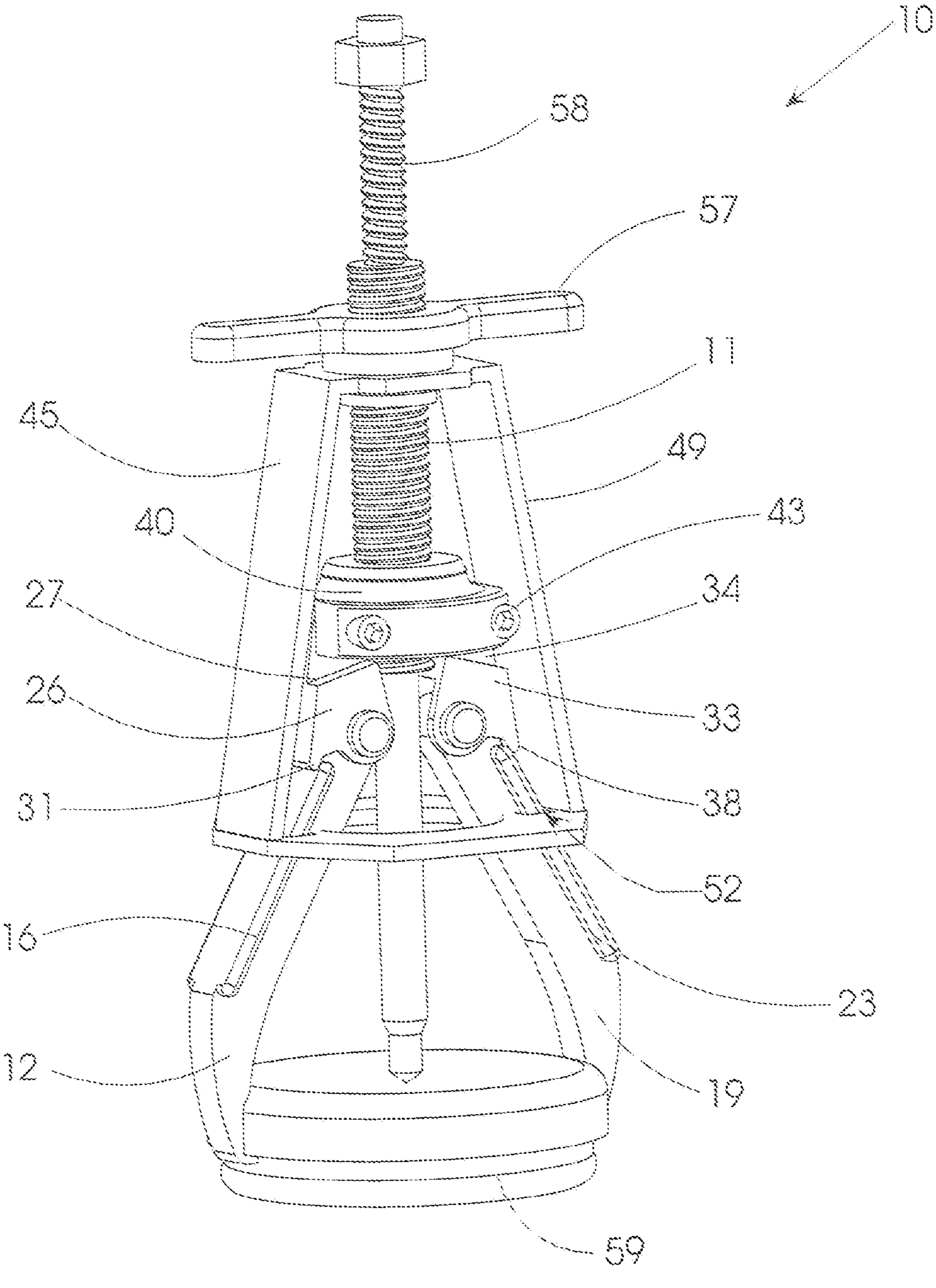
FIG. 2 is a perspective view of the puller with the linkage being loaded as shown in the attachment.
Figure 3:
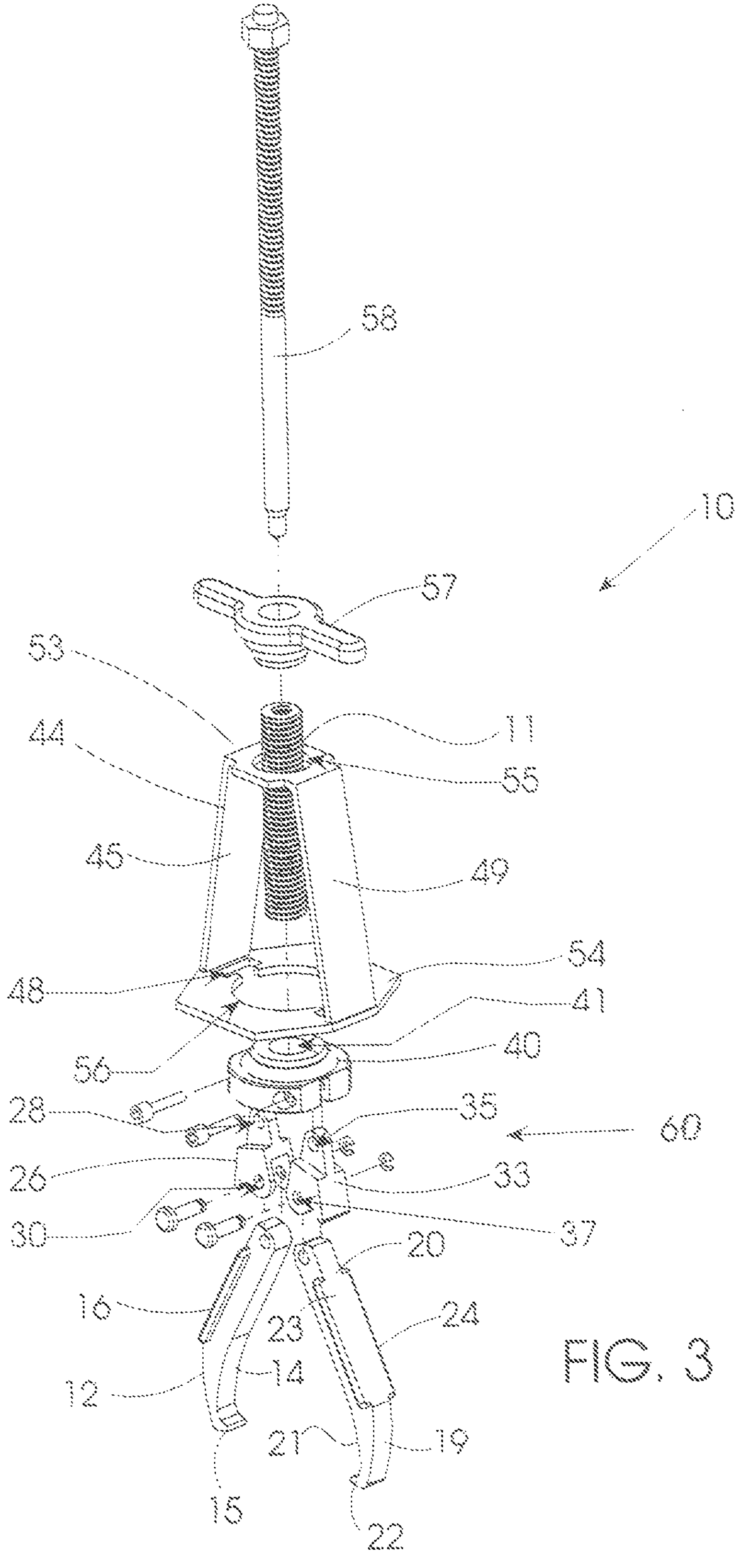
FIG. 3 is an exploded perspective view of the puller device.

With reference now to the drawings, and in particular to FIGS. 1 through 3 thereof, a new puller device embodying the principles and concepts of the present invention and generally designated by the reference numeral 10 will be described.

As best illustrated in FIGS. 1 through 3, the puller device 10 generally comprises a jaw support assembly 60, jaw members 12,19 being in operable communication with the jaw support assembly 60, a jaw actuating assembly 44,57 being supported by the jaw support assembly 60 and including a jaw guide member 44 being in operable communication with the jaw members 12,19, and an elongate push member 58 being adjustable relative to and in operable communication with the jaw support assembly 60.

The jaw support assembly 60 includes pivot members 26,33,40 being pivotally and conventionally attached with fasteners to the jaw members 12,19 for increasing radial movement and increasing clamping force of the jaw members 12,19 about a work piece which is press fitted in an object. The pivot members 26,33,40 includes linkage members 26,33 being pivotally and conventionally attached with fasteners to the jaw members 12,19 and being in operable communication with the jaw support assembly 60. Each linkage member 26,33 is a strip of solid material and has a distal end 29,36 and also has a hole 30,37 being disposed therethrough approximate to the distal end 29,36 and through which the fasteners are inserted. The distal end 29,36 of each linkage member 26,33 is pivotally fastened with the fasteners to a respective jaw member 12,19. Each linkage member 26,33 also has a lug 31,38 integrally extending outwardly from a portion of the distal end 29,36 and being engagable to a respective jaw member 12,19. The lug 31,38 of each linkage member 26,33 is longitudinally aligned with an outer edge 3,39 of a respective linkage member 26,33 and is engagable to an outer edge 18,25 of a respective jaw member 12,19. The pivot members 26,33,40 further include a collar 40 being securely and conventionally supported by the jaw support assembly 60. The collar 40 is a block of material with a bore 41 being disposed therethrough. The block of material further has ears 42,43 being spaced apart and extending about a circumference thereof with each ear 42,43 having a hole being disposed therethrough. Each linkage member 26,33 has a proximate end 27,34 and a hole 28,35 being disposed therethrough approximate to the proximate end 27,34 with the proximate end 27,34 being pivotally attached with a conventional fastener to the collar 40 and in particular to a respective ear 42,43 of the collar 40.

The jaw members 12,19 are pivotally and conventionally attached with fasteners to at least one of the collar 40 and the linkage member 26,33 for increasing radial movement and increasing clamping force of the jaw members 12,19. Each jaw member 12,19 has a proximate end 13,20 being pivotally fastened to at least one pivot member and has an arcuate distal end 14,21 being engagable to a work piece being removed from an object. Each jaw member 12,19 has flanges 16,17, 23,24 being integrally attached to and extending along either side of the jaw member 12,19. Each jaw member 12,19 has a curved tip 15,22 at the distal end 14,21 thereof for engaging and gripping the work piece being removed from the object.

The jaw guide member 44 includes transverse support members 53,54 being spaced apart and also includes brace members 45,49 conventionally interconnecting the transverse support members 53,54. The support members 53,54 are planar members and includes a first planar member 53 and a second planar member 54 with the planar members 53,54 each having an opening 55,56 being centrally disposed therethrough. The second planar member 54 further has T-shaped slots 48,52 being disposed therethrough near a perimeter thereof as viewed above or below the centrally-disposed opening 56. The flanges 16,17,23,24 of each jaw member 12,18 is movably and engagably received in a respective T-shaped slot 48,52 with the jaw guide member 44 pivoting the jaw members 12,19 relative to the pivot members 26,33, 40 and to the work piece 59. The jaw actuating assembly also includes a jaw guide actuating member 57 supporting the jaw guide member 44 and being in operable communication with the jaw support assembly 60. The jaw support assembly 60 further includes a hollow threaded shaft 11 with the collar 40 being securely and conventionally supported thereto with a portion of the hollow threaded shaft 11 being conventionally secured in the bore 41 of the collar 40. The jaw guide actuating member 57 is a handle being threaded upon the hollow threaded shaft 11. The hollow threaded shaft 11 is disposed through the centrally-disposed opening 55 of the first planar member 53 with the brace members 45,49 being attached at the perimeters of the first and second planar members 53,54 with the first planar member 53 being engagable to the handle 57. The elongate push member 58 is a rod being threaded through the hollow threaded shaft 11 and being engagable to the work piece 59 with a nut or some other member being attached to an end of the rod to facilitate the threading of the rod through the hollow threaded shaft 11 and into engagement with the object.

In use, the puller device 10 is positioned before the work piece to be removed from the object and the handle is unthreaded along a portion of the hollow threaded shaft 11 to move the jaw guide member 44 away from the jaw members 12,19 which spreads apart the jaw members 12,19 because the second planar member 54 engage the flanges 16,17,23,24 to spread apart the jaw members 12,19. The user is able to manipulate the handle much faster because the threads along the hollow threaded shaft 11 are gapped and spread more than double farther apart than what is conventional so that it takes the user fewer windings to move the handle along the hollow threaded shaft 11 thus increasing performance by reducing the amount of time to move the handle and the jaw members 12,19. Because of the wider gap of the threads on the hollow threaded shaft 11, there will be less torque generated and to compensate for that, the linkage members 26,33 put more pressure and force on the jaw members 12,19. Once the jaw members 12,19 are spread far enough apart to allow the curved tips 15,22 of the jaw members 12,19 to be placed about the work piece, the user threads the handle toward the jaw members 12,19 along the hollow threaded member 11 which pulls and draws the jaw members 12, 19 together about the work piece because of the second planar member 54 engaging the flanges 16,17,23,24 and the linkage members 26,33. Once the jaw members 12,19 are tightly secured about the work piece, the user then threads the elongate push member 58 using a suitable tool through the hollow threaded shaft 11, which engages and pushes against the object with the effect of the jaw members 12,19 pulling on the work piece 59 thus causing the jaw members 12,19 to essentially straighten out and putting torque on the jaw members 12,19. The elongate push member 58 is continually threaded until the work piece is removed from the object, and then the jaw members 12,19 are removed from the work piece by once again unthreading the handle along the hollow threaded shaft 11.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the puller device. Further, since numerous modifications and changes will readily occur to those skilled in the art, it is not desired to limit the invention to the exact construction and operation shown and described, and accordingly, all suitable modifications and equivalents may be resorted to falling within the scope of the invention.

We claim:

1. A puller device comprising:

a jaw support assembly;

jaw members in operable communication with said jaw support assembly, wherein said jaw support assembly includes at least one pivot member pivotally attached to at least one of said jaw members for increasing radial movement and increasing clamping force of said at least one of said jaw members, wherein said at least one pivot member includes at least one linkage member pivotally attached to at least one of said jaw members and being in operable communication with said jaw support assembly, wherein said at least one pivot member includes a collar, wherein said at least one linkage member has a proximate end and a hole disposed therethrough approximate to said proximate end with said proximate end pivotally attached to said collar, wherein said jaw members are pivotally attached to said at least one linkage member for increasing radial movement and increasing clamping force of said jaw members, wherein each said jaw member has a proximate end pivotally fastened to said at least one pivot member and has an arcuate distal end adapted to being engagable to a work piece being removed from an object, wherein each said jaw member has flanges extending along either side of said jaw member;

a jaw actuating assembly supported by said jaw support assembly and including a jaw guide member in operable communication with said jaw members; and an elongate push member being adjustable relative to and in operable communication with said jaw support assembly.

2. The puller device as described in claim 1, wherein said jaw guide member includes transverse support members being spaced apart and also includes brace members interconnecting said transverse support members.

3. The puller device as described in claim 2, wherein said support members are planar members and include a first planar member and a second planar member with said planar members each having an opening being centrally disposed therethrough.

4. The puller device as described in claim 3, wherein said second planar member further has T-shaped slots being disposed therethrough near a perimeter thereof as viewed above or below the centrally-disposed opening, said flanges of each said jaw member being movably and engagably received in a respective said T-shaped slot with said jaw guide member pivoting said jaw members relative to said at least one pivot member and to the work piece.

5. The puller device as described in claim 4, wherein said jaw actuating assembly also includes a jaw guide actuating member supporting said jaw guide member and being in operable communication with said jaw support assembly.

6. The puller device as described in claim 5, wherein said jaw support assembly further includes a hollow threaded shaft with said collar being securely supported thereto, said jaw guide actuating member being a handle and being threaded upon said hollow threaded shaft.

7. The puller device as described in claim 6, wherein said hollow threaded shaft is disposed through said centrally-disposed opening of said first planar member with said brace members being attached at the perimeters of said first and second planar members, said first planar member being engagable to said handle.

8. The puller device as described in claim 6, wherein each said elongate push member is a rod being threaded through said hollow threaded shaft and being engagable to the work piece.

* * * * *